(12) United States Patent
Yabe et al.

(10) Patent No.: US 8,137,638 B2
(45) Date of Patent: Mar. 20, 2012

(54) HYDROGEN GENERATION APPARATUS, LASER REDUCTION APPARATUS, ENERGY CONVERSION APPARATUS, HYDROGEN GENERATION METHOD AND ELECTRIC POWER GENERATION SYSTEM

(75) Inventors: Takashi Yabe, Tokyo (JP); Kazunari Ikuta, Aichi (JP)

(73) Assignee: Tokyo Institute of Technology, Tokyo (JP)

( * ) Notice: Subject to any disclaimer, the term of this patent is extended or adjusted under 35 U.S.C. 154(b) by 223 days.

(21) Appl. No.: 11/908,873

(22) PCT Filed: Mar. 8, 2006

(86) PCT No.: PCT/JP2006/304470
§ 371 (c)(1),
(2), (4) Date: Jan. 14, 2008

(87) PCT Pub. No.: WO2006/100915
PCT Pub. Date: Sep. 28, 2006

(65) Prior Publication Data
US 2009/0010837 A1    Jan. 8, 2009

(30) Foreign Application Priority Data

Mar. 18, 2005 (JP) ................................. 2005-079451
May 11, 2005 (JP) ................................. 2005-138074
Oct. 31, 2005 (JP) ................................. 2005-317226

(51) Int. Cl.
*B01J 19/08* (2006.01)
*C01B 3/08* (2006.01)
(52) U.S. Cl. ...................................... 422/186; 423/657
(58) Field of Classification Search .................. 422/186; 423/657
See application file for complete search history.

(56) References Cited

U.S. PATENT DOCUMENTS
4,701,592 A * 10/1987 Cheung .................... 219/121.77

FOREIGN PATENT DOCUMENTS
CN          1345982      *  4/2002
(Continued)

OTHER PUBLICATIONS

English Language Abstract of JP 2004-182496.
(Continued)

*Primary Examiner* — Jessica L Ward
*Assistant Examiner* — Alexander Polyansky
(74) *Attorney, Agent, or Firm* — Greenblum & Bernstein, P.L.C.

(57) ABSTRACT

Object: To provide a hydrogen generation apparatus, a laser reduction apparatus, an energy conversion apparatus, a hydrogen generation method and an electric power generation system.
Means for Solving the Problems: A hydrogen generation apparatus 10 according to the present invention includes: a reaction vessel 12 for retaining a metal element; a water reservoir 16 for supplying water into the reaction vessel 12; and a hydrogen recovery tube for recovering hydrogen gas and reaction energy generated by reaction of the metal element with the water. The present invention may further include a hydrogen storage device 26 for storing recovered hydrogen gas. Further, in the present invention, an oxide or a hydroxide of the metal element generated by reducing the hydrogen gas may be subjected to laser reduction to regenerate the metal element. A solar light pumped laser may be used for laser reduction. Further, according to the present invention, there may be provided an energy conversion apparatus for generating an electric current by using charged particles formed due to the laser reduction, and an electric power generation system using the above hydrogen generation system.

3 Claims, 9 Drawing Sheets

FOREIGN PATENT DOCUMENTS

| | | | |
|---|---|---|---|
| JP | 53039274 | * | 4/1978 |
| JP | 405286717 | * | 11/1993 |
| JP | 7-109102 | | 4/1995 |
| JP | 8-59201 | | 3/1996 |
| JP | 8-109001 | | 4/1996 |
| JP | 8-259389 | | 10/1996 |
| JP | 11-323410 | | 11/1999 |
| JP | 2002-69558 | | 3/2002 |
| JP | 2003-226502 | | 8/2003 |
| JP | 2003-313001 | | 11/2003 |
| JP | 2004-67422 | | 3/2004 |
| JP | 2004-182496 | | 7/2004 |
| JP | 2004-231466 | | 8/2004 |
| JP | 2004-313831 | | 11/2004 |

OTHER PUBLICATIONS

English Language Abstract of JP 2004-67422.
English Language Abstract of JP 8-259389.
English Language Abstract of JP 11-323410.
English Language Abstract of JP 2004-313831.
English language abstract of Kazuo Imazaki "Uchu Taiyoko Laser to Suiso Seisei", Institute for Laser Technology News, No. 195, pp. 1 to 3, 2004.
English language abstract of Chobei Yamabe "Plasma o Mochiita Hikari Denki Energy Henkan to Denryoku no Denso", The Institute of Electrical Engineers of Japan Zenkoku Taikai Koen Ronbunshu, vol. 1989, No. 2, 1989, p.s. 2-21-s. 2-24.
Nakashima et al. "VUV Laser Photolysis of $CO_2$ Systems" Energy Conversion and Management, vol. 36, No. 6-9, 1995, pp. 695-676.
English Language Abstract of JP 2003-313001.
English Language Abstract of JP 2003-226502.
English Language Abstract of JP 2002-69558.
English Language Abstract of JP 8-109001.
English Language Abstract of JP 8-59201.
English Language Abstract of JP 7-109102.
English Language Abstract of JP 2004-231466.

* cited by examiner

HYDROGEN GENERATION APPARATUS, LASER REDUCTION APPARATUS, ENERGY CONVERSION APPARATUS, HYDROGEN GENERATION METHOD AND ELECTRIC POWER GENERATION SYSTEM

FIELD OF THE INVENTION

The present invention relates to a technique for recovering reaction energy from an element such as sodium, potassium, magnesium, aluminum, calcium and zinc, and for generating hydrogen gas, more particularly, the present invention relates to a hydrogen generation apparatus for reducing water into hydrogen by using a metal, a laser reduction apparatus for reducing a generated metal oxide or a chemical substance by using a laser, an energy conversion method, a hydrogen generation system and a electric power generation system.

BACKGROUND ART

Hydrogen gas have been paid attention as a clean fuel for a fuel cell since the hydrogen generates water even so it oxidized with an oxidizing agent and, in recent years, the hydrogen gas attracts much attention as a fuel on the basis of requirement that an energy infrastructure would be switched from fossil fuel to a clean energy in the viewpoints of fossil fuel exhaustion and global warming. Hydrogen has hitherto been generated by electrolysis, charged into a high-pressure vessel, and then transported for use in various places. Accordingly, the use of hydrogen gas needs heavy containers for transportation, needs careful handling due to the flammability thereof, and is not satisfactory in the view of long-term storability thereof.

Accordingly, in the future, it is considered that an apparatus and a method for simply generating hydrogen gas with a clean energy will be required instead of the transportation of hydrogen gas. Further, as for the generation of hydrogen gas, it is considered that a technique for generating hydrogen gas while effectively using a renewable energy will be required instead of the use of a large amount of electricity, which is generated by a method using a huge amount of fossil energy, such as electrolysis of water. Further, it is preferable that an apparatus and a method for generating hydrogen reuse a raw material as much as possible.

There has been known a method for thermally reducing an oxide resource such as a magnesium-containing oxide (magnesium oxide or dolomite) by using arc discharge to reduce the oxide resource at a temperature as high as approximately 1,000 Celsius degrees. And it is thought that hydrogen gas could be obtained by adding water to such the system. However, in consideration of circumstance in that the object for obtaining hydrogen gas is to generate a clean energy for retrenching $CO_2$ and the like, it is considered that the electricity for generating the arc discharge causes an increase of environmental loads in many cases.

Further, various apparatuses and methods for generating hydrogen have been proposed. For example, Japanese Patent Laid-Open No. 2003-313001 (Patent Literature 1) discloses a hydrogen generation method for generating hydrogen by subjecting a hydride to hydrolysis in a sealable vessel where the hydride and water are separated by a member formed at least partially from a water-repellent steam-permeable material having a permeability for steam, while the molecules of the water penetrated through the water-repellent steam-permeable material react with the hydride.

Further, Japanese Patent Laid-Open No. 2003-226502 (Patent Literature 2) discloses a hydrogen generation apparatus for recovering hydrogen generated by a hydrogen recovery means, the hydrogen generation apparatus including: a container for retaining a hydrogen generation fuel consisted of aluminum and an alkali metal or an alkali earth metal; a heating means for melting the hydrogen generation fuel by heat to alloy, the hydrogen generation fuel being retained in the container; and a water supply means for supplying water to the hydrogen generation fuel in the above container.

Further, Japanese Patent Laid-Open No. 2002-69558 (Patent Literature 3) discloses a hydrogen generation apparatus using a hydrogen generation fuel made of an alloy of aluminum and an alkali metal or an alkali earth metal, the hydrogen generation apparatus being provided with a cooling means for cooling the interior of the container, and a hydrogen generation method therewith.

Further, Japanese Patent Laid-Open No. H8-109001 (Patent Literature 4) discloses a hydrogen generation method including the steps of melting a reaction metal body with a heat source, reserving this melted reaction metal body in the bottom of a container while supplying water to the melted reaction metal body to cause a thermo-chemical reaction, and taking the obtained hydrogen out, and discharging the oxidized metal body into outside of the container with a discharge means.

Further, Japanese Patent Laid-Open No. H8-59201 (Patent Literature 5) and Japanese Patent Laid-Open No. H7-109102 (Patent Literature 6) disclose a hydrogen generation method using water contained in a container and a reaction metal body, that reacts electro-thermo-chemically with the water, the method including the steps of supplying the water from the upper part of the reaction metal body, and generating the hydrogen gas due to electro-thermo-chemical reaction of the reaction metal body and the water, and an apparatus thereof.

Further, Japanese Patent Laid-Open No. 2004-231466 (Patent Literature 7) discloses a hydrogen generation material containing aluminum powder of a mixture ratio less than 85 mass % and calcium oxide powder for generating hydrogen from water, and a method and an apparatus for generating hydrogen by using the above material.

The above apparatus and the above methods for generating hydrogen aim to generate hydrogen gas with the use of an electric furnace, electrochemical reaction or a high hydrogen atom containing substance to heat a mixture while the mixture being a hydrogen generation material to realize a high temperature state where the water could be reduced by the metal. In this case, the metal element will oxidize into a metal oxide after the hydrogen generation. However, when the metal oxide is abolished or used for another purpose, the interminable use of the metal element may be require to generate hydrogen and, in case where aluminum is used for example, a total environmental cost including a electric power consumption, the use of a fossil fuel for providing the electricity and the like is not always low.

On the other hand, both oxidization and reduction of a metal element are carried out at a high temperature except to the case where a wet electrochemical method is adopted. In this case, it is considered that the environmental cost including a material cost for hydrogen generation could be extremely retrenched when a hydrogen generation apparatus capable of oxidizing the metal element at a minimum apparatus cost to generate hydrogen, changing the process target and reducing the metal oxide to generate a metal with a minimum change of the apparatus structure, could be provided.

Furthermore, in recent years, environmental problems related to chemical substances are well known so far, for example, nitrogen oxides $NO_x$ are required to decline from the viewpoints of natural destruction and structures' degradation due to acid rain generated thereby. Further, carbon dioxide $CO_2$ as a major factor of the global warming is also requested to decline globally. In addition, low cost decomposition and/or conversion methods of particular chemical substances such as dioxin and endocrine disruptor chemicals are also required.

On the other hand, a laser apparatus generates a laser beam mainly by converting an electric energy into a form of light (turns on a lamp) or an electric discharge to pump a laser medium. It is known that such method includes a plurality of energy conversion processes and has a low-energy efficiency (not more than a few percent). The reason may include the fact that an electric energy, which has originally high quality, is converted into light through a low-efficient energy conversion in use. Further, the semiconductor laser pumped solid state laser has been proposed as the improvement for the above points. Approximately 50% of photo-electric conversion efficiency is becoming available and it is though that the generality thereof will further improve.

On the other hand, a solar light pumped laser using solar light as a light source has been also known so far. It is considered that when solar light is used as a pumping light source, laser oscillation could be performed without using any low efficient photo-electric conversion processes that directly consume electricity generated by a fossil fuel. Accordingly, it is considered that a laser apparatus for industrial apparatuses such as a hydrogen generation apparatus and a laser reduction apparatus is possible to use more easily, at a low cost and with a low environmental load. Additionally, electric power generation methods without using a fossil fuel, such as wind power generation, tidal power generation and geothermal power generation, are being put to practical use. For example, though an amount of power generated by the wind power generation extremely varies depending on conditions, however the peak amount of the generated power exceeding 2,000 kWh is possible to provide recently. However, the wind power generation has a large problem in that the amount of the generated power is extremely varied depending on the conditions. Use of a laser reduction apparatus employing a laser that oscillates by the power generated as described above enables to store the energy in a form of magnesium and to supply the energy with a low environmental load.

Further, it was found that a metal ion is generated at the initial process of the decomposition of a metal oxide or the like when laser reduction is performed. The metal ion generated by the laser reduction forms local plasma and could therefore be controlled by using a well-known magnetic confinement system. Further, since metal ions and anion move oppositely to each other in the direction perpendicular to the direction of the magnetic field, it is expected that taking out from the system as an electric current enables energy conversion by photo-electric conversion.

Patent Literature 1: Japanese Patent Laid-Open No. 2003-313001
Patent Literature 2: Japanese Patent Laid-Open No. 2003-226502
Patent Literature 3: Japanese Patent Laid-Open No. 2002-69558
Patent Literature 4: Japanese Patent Laid-Open No. H8-109001
Patent Literature 5: Japanese Patent Laid-Open No. H8-59201
Patent Literature 6: Japanese Patent Laid-Open No. H7-109102
Patent Literature 7: Japanese Patent Laid-Open No. 2004-231466

DISCLOSURE OF INVENTION

The case where hydrogen is produced from water by using the above metal element, suffers from a difficulty in processing and abolishing of the oxide, which is produced as a by-product, due to the high alkalinity thereof. Furthermore, the oxide of the metal element may be converted again into an alkaline metal or an alkaline earth metal by subjecting decomposition thereof at a high temperature. Accordingly, it is considered that, when high temperature environment may be generated by a renewable energy, generation of hydrogen gas by a method with a least amount of environmental load would be possible.

Further, a conventional general laser device consumes electricity and has a low photo-electric energy conversion efficiency, on the other hand, only experimental studies of a solar light pumped laser have been done in universities and research institutes, suffering a difficulty in application for an industrial purpose thereof.

The present invention has been made by considering the conventional arts described hereinbefore, and an object of the present invention is to provide a hydrogen generation apparatus which efficiently uses a renewable energy for recovering reaction energy and for generating hydrogen gas.

Another object of the present invention is to provide a laser reduction apparatus capable of reducing a generated metal oxide into an alkaline metal or an alkaline earth element again by using a renewable energy.

A still another object of the present invention is to provide a hydrogen generation method using the above hydrogen generation apparatus and the above laser reduction apparatus.

Further another object of the present invention is to provide a laser reduction apparatus capable of decomposing oxygen-containing chemical substances such as $NO_x$, $CO_2$, dioxin and endocrine disruptor chemicals, or converting these chemical substances into other compounds.

Further a still another object of the present invention is to provide an apparatus for converting energy, which is based on the finding that a metal cation is generated during laser reduction of an alkaline metal or an alkaline earth metal, by controlling the generated plasma with magnetic confinement with generated charged particles, and an electric power generation system therewith.

Means for Solving the Problems

The present invention has been completed by paying attention to the fact that a metal element is capable of reducing water into hydrogen gas when the temperature thereof is elevated by a burning process or when the metal element is only contacted to the water, and the generated oxide is capable of giving the metal element again by being subjected to thermal decomposition. In the present invention, first the alkaline metal or the alkaline earth element is subject to burning while the water supplying thereto under the condition where high temperature is maintained. The supplied water generates hydrogen by a reductive ability of the metal element, recovering the generated hydrogen.

Thereafter, the oxide obtained as a by-product is subject to thermal decomposition by being heated into a high temperature by the laser beam to generate the metal element again. The heating process in the present invention is carried out by using a solar light pumped laser and is capable of minimizing an amount of energy originated from fossil fuel for heating. The regenerated metal element is used to generate hydrogen again.

Further, in the present invention, the particular chemical substances such as alkaline metal, alkaline earth metal, $NO_x$ and $CO_2$ are efficiently decomposed or converted at a low cost by using a laser light source such as a solar light pumped laser, and use of charged particles generated in a plasma enables energy conversion.

Problems to be Solved by the Invention

That is to say, according to the present invention, there may be provided a hydrogen generation apparatus including: a reaction vessel for retaining a metal element; a water reservoir for supplying water into the reaction vessel; a laser for heating a part where the metal element contacts to the water to heat the metal element; and a hydrogen recovery tube for recovering hydrogen gas and reaction energy generated by reaction of the metal element with the water.

According to the present invention, the metal element may be selected from a group consisting of sodium, potassium, magnesium, aluminum, calcium, zinc and any admixture thereof. The hydrogen generation apparatus may include a hydrogen storage device for storing the recovered hydrogen gas, the hydrogen storage device being provided with a hydrogen storage alloy.

According to the second aspect of the present invention, there is provided a laser reduction apparatus for reducing a metal oxide into metal by using a laser beam, the laser reduction apparatus including: a vacuum vessel for retaining a metal oxide provided with a window; and a laser for irradiating a laser beam into the vacuum vessel through the window to reduce the metal oxide.

According to the present invention, the metal oxide may be selected from a group consisting of sodium oxide, potassium oxide, magnesium oxide, aluminum oxide, zinc oxide and any admixture thereof. The laser may be a solar light pumped laser.

According to the third aspect of the present invention, there may be provided a hydrogen generation method for generating hydrogen gas by reducing water with metal, the method including the steps of generating a metal oxide or a metal hydroxide by contacting a metal element with water under high temperature to reduce into hydrogen gas; recovering the generated hydrogen gas; and regenerating metal by subjecting the generated metal oxide or the metal hydroxide to laser reduction.

According to the present invention, the metal may be selected from a group consisting of sodium, potassium, magnesium, aluminum, zinc and any admixture thereof. The method may include a step of storing the recovered hydrogen gas, the step of storing the recovered hydrogen gas including a sub-step of absorbing the hydrogen gas into a hydrogen storage alloy. The metal oxide or the metal hydroxide is reduced by using a solar light pumped laser by the laser reduction.

According to the fourth aspect of the present invention, there is provided a laser reduction apparatus for reducing an oxygen-containing chemical substance by using a laser beam, the laser reduction apparatus including: a vacuum vessel for retaining the chemical substance provided with an window; and a solar light pumped laser for irradiating a laser beam into the vacuum vessel through the window to reduce the chemical substance.

According to the fifth aspect of the present invention, there is provided an energy conversion apparatus for converting energy by laser reduction of an oxygen-containing chemical substance by using a laser beam, the energy conversion apparatus including: a container for retaining a chemical substance; a laser for generating plasma from the chemical substance; a magnetic field generation apparatus for generating a magnetic field in which the plasma is deflected; a grid disposed in the container for taking an electric current out from the plasma in the container; and a capacitor for accumulating an electric charge generated by the plasma at the outside of the container.

According to the sixth aspect of the present invention, there may be provided a hydrogen generation apparatus including: a reaction vessel for reacting a metal element; a water reservoir for supplying water into the reaction vessel; a feeder for supplying a mold of the metal element into the reaction vessel to contact with the water; a hydrogen recovery tube for recovering hydrogen gas and reaction energy generated by reaction of the metal element with the water; and an activation means for activating to a state where the oxidization reaction of the metal element in the reaction vessel is maintained.

Further according to the present invention, the hydrogen generation apparatus may further include a coolant jacket for cooling the reaction vessel. In the present invention, the hydrogen generation apparatus may include a recovery container for recovering oxide powder of the metal element, the recovery container being separated from the reaction vessel by a sieve.

Furthermore, according to the seventh aspect of the present invention, there may be provided an electric power generation system provided with the hydrogen generation apparatus as described above.

Further, according to the eighth aspect of the present invention, there may be provided a regenerative hydrogen generation apparatus including: a reaction vessel for retaining a metal-containing substance; a water reservoir for supplying water into the reaction vessel; a hydrogen recovery tube for recovering hydrogen gas and reaction energy generated by reaction of the metal-containing substance with the water caused by heating a part where the metal-containing substance contacts to the water to oxidize the metal-containing substance; an energy converting apparatus for converting energy by using the hydrogen gas from the hydrogen recovery tube; a reduction apparatus for reducing an oxygen-containing compound generated by oxidizing the metal-containing substance to regenerate the metal-containing substance; and a recovering apparatus for recovering a metal-containing substance regenerated by the reduction apparatus.

ADVANTAGES OF THE INVENTION

According to the present invention, a hydrogen generation apparatus capable of generating hydrogen gas by using a renewable energy efficiently may be provided.

Further according to the present invention, a laser reducing apparatus capable of reducing a generated metal oxide into a metal again by using a renewable energy may be provided.

Further according to the present invention, a hydrogen generation method using the above hydrogen generation apparatus and the above laser reduction apparatus may be provided.

Further, according to the present invention, a laser reduction apparatus capable of efficiently removing chemical substances such as $NO_x$ and $CO_2$, which cause a large environmental load, without any energy consumption for reduction accompanying with the generation of $NO_x$ and $CO_2$ may be provided. Furthermore a substance conversion apparatus using a laser for decomposing particular chemical substances such the above harmful substances and an energy conversion apparatus capable of photo-electric conversion by efficiently use of changed particles generated during the decomposition may be provided.

Further, according to the present invention, a hydrogen generating system with a low environmental load, which is capable of the efficient regenerative use of a material such as a metal-containing substance that requires a large amount of energy to generate thereto in use, and is capable of restraining the consumption of the metal-containing substance at a minimum level by only using inexhaustible water on the earth as long as seawater is considered.

BEST MODE FOR CARRYING OUT THE INVENTION

Section 1

Hydrogen Generation Apparatus—First Embodiment

Figure 1:
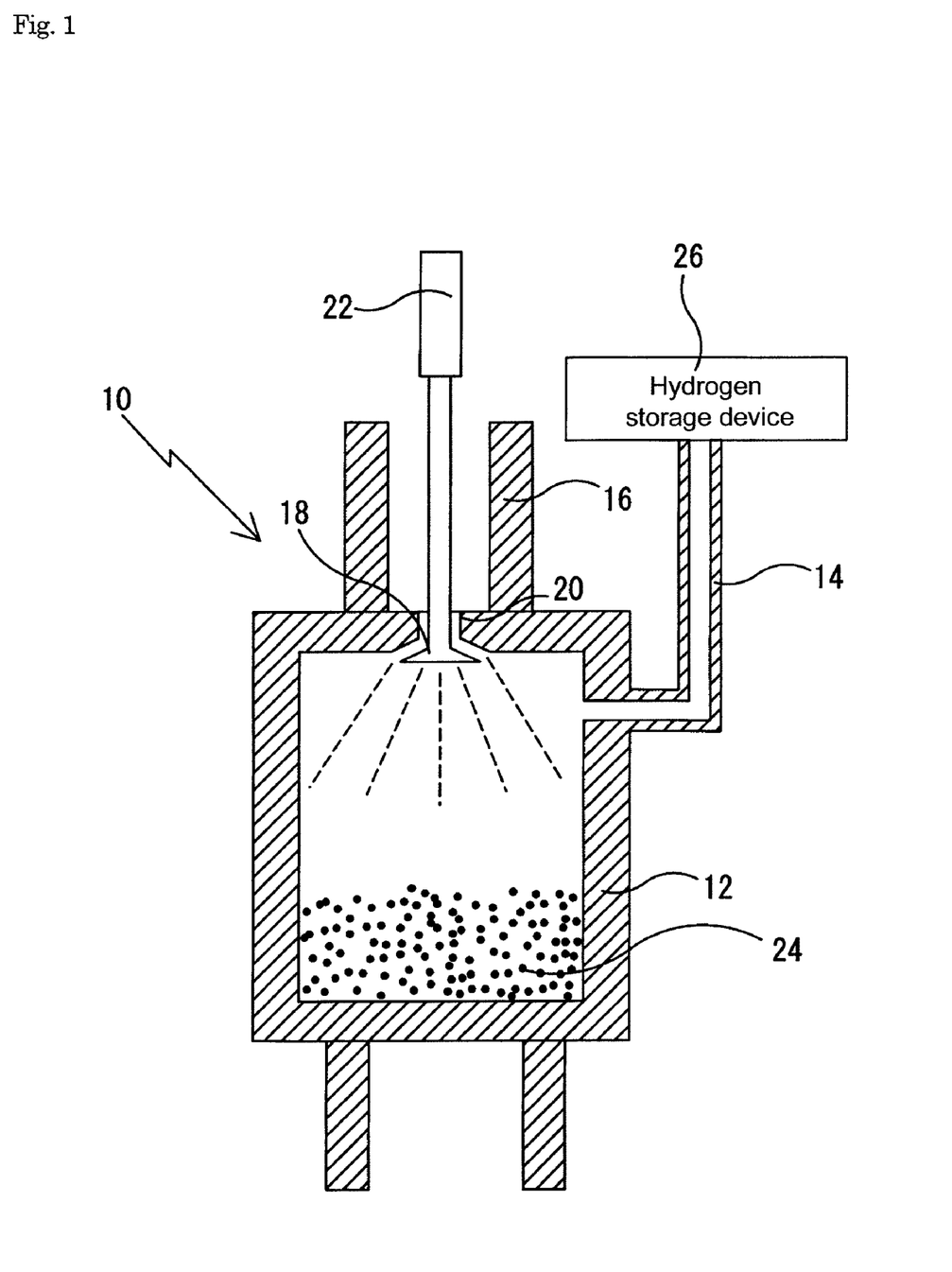
FIG. 1 is the schematic view of the hydrogen generation apparatus according to the present invention.

FIG. 1 shows the schematic structure of the hydrogen generation apparatus according to the present invention. The hydrogen generation apparatus 10 according to the present invention includes mainly the reaction vessel 12, the hydrogen recovery tube 14 for taking generated hydrogen out to the outside of the system, and the water reservoir 16 for supplying water into the reaction vessel. The opening 20 provided between the reaction vessel 12 and the water reservoir 16, and the valve 18 is closed when water is not being supplied. When water is being supplied into the reaction vessel 12, the valve 18 is driven manually or by an electric actuator 22 to supply water stored in the water reservoir 16 into the reaction vessel 12. The material 24 including a metal element such as metal magnesium is stored in the bottom of the reaction vessel 12. The metal available in the present invention is sodium, potassium, magnesium, aluminum, calcium, zinc or admixture thereof. Particular examples of metals available in the present invention further include alkaline metal elements and alkaline earth elements. Furthermore, particular examples of compounds decomposable by the present invention include oxygen-containing chemical substances such as $NO_x$, $CO_2$, dioxin and endocrine disrupter chemicals.

The embodiment shown in FIG. 1 will be further explained. The material 24 such as metal magnesium is ignited in the reaction vessel 12 first, and then is burned in the presence of oxygen to be high-temperature state. Further the term "high temperature" used in the present invention does not include a room temperature, but does means the temperature at which the material used in the present invention is capable of reducing water. In this step, the valve 18 is opened manually or by the electric actuator to shower the water into the reaction vessel 12. Then, according to the particular embodiment of the present invention, the metal magnesium is burning at the high temperature, and the magnesium heated into the high temperature reduces the supplied water to generate hydrogen gas. The generated hydrogen gas is taken out into the outside of the system through the hydrogen recovery tube 14 disposed above the reaction vessel 12, and the energy is recovered by a heat exchanger (not shown) or the like, which is consumed directly by a hydrogen consumption apparatus such as an automobile mounting a fuel cell. The recovered reaction energy may be reused to heat the reaction vessel or the like. Further, in the present invention, a whole or a portion of the generated hydrogen gas may be stored in a hydrogen storage device 26 provided with a hydrogen storage alloy or the like, and then the hydrogen gas may be released for use in accordance with necessity. Additionally, in the present invention, the material is not necessarily heated into the high temperature when hydrogen gas is generated by reducing the water with metal sodium, metal lithium or the like at a room temperature.

Particular examples of hydrogen storage alloys available in the present invention include $La_{0.8}Nb_{0.2}Ni_{2.5}CO_{2.4}Al_{0.1}$, $La_{0.8}Nb_{0.2}Zr_{0.03}Ni_{3.8}Cu_{0.7}Al_{0.5}$, $MmNi_{3.65}Cu_{0.75}Mn_{0.4}Al_{0.3}$, $MmNi_{2.5}Cu_{0.7}Al_{0.8}$, $Mm_{0.85}Zr_{0.15}Ni_{1.0}Al_{0.8}V_{0.2}$ (where Mm is a mish metal and is a mixture of rare metals containing Ce (40% to 50%), La (20% to 40%), Pr and Nd as main elements). Additional examples of hydrogen storage alloys available in the present invention include but not limited to Laves phase ($AB_2$ type) alloys, particularly, Ti—Mn series, Ti—Cr series and Mr—Mn series alloys, more particularly $(Ti_{z-x}Zr_xV_{4-y}Ni_y)_{1-z}Cr_2$, $ZrV_{0.41}Ni_{1.6}$, $ZrMn_{0.6}Cr_{0.2}Ni_{1.2}$. The magnesium after hydrogen generation reaction is converted into an oxide or a hydroxide such as magnesium oxide or magnesium hydroxide, being stored in the reaction vessel 12. Thereafter, the stored magnesium oxide or the stored magnesium hydroxide may be taken out from the reaction vessel 12 and may be used as a raw material for regenerating metal magnesium or the like.

Section 2

Laser Reduction Apparatus

Figure 2:
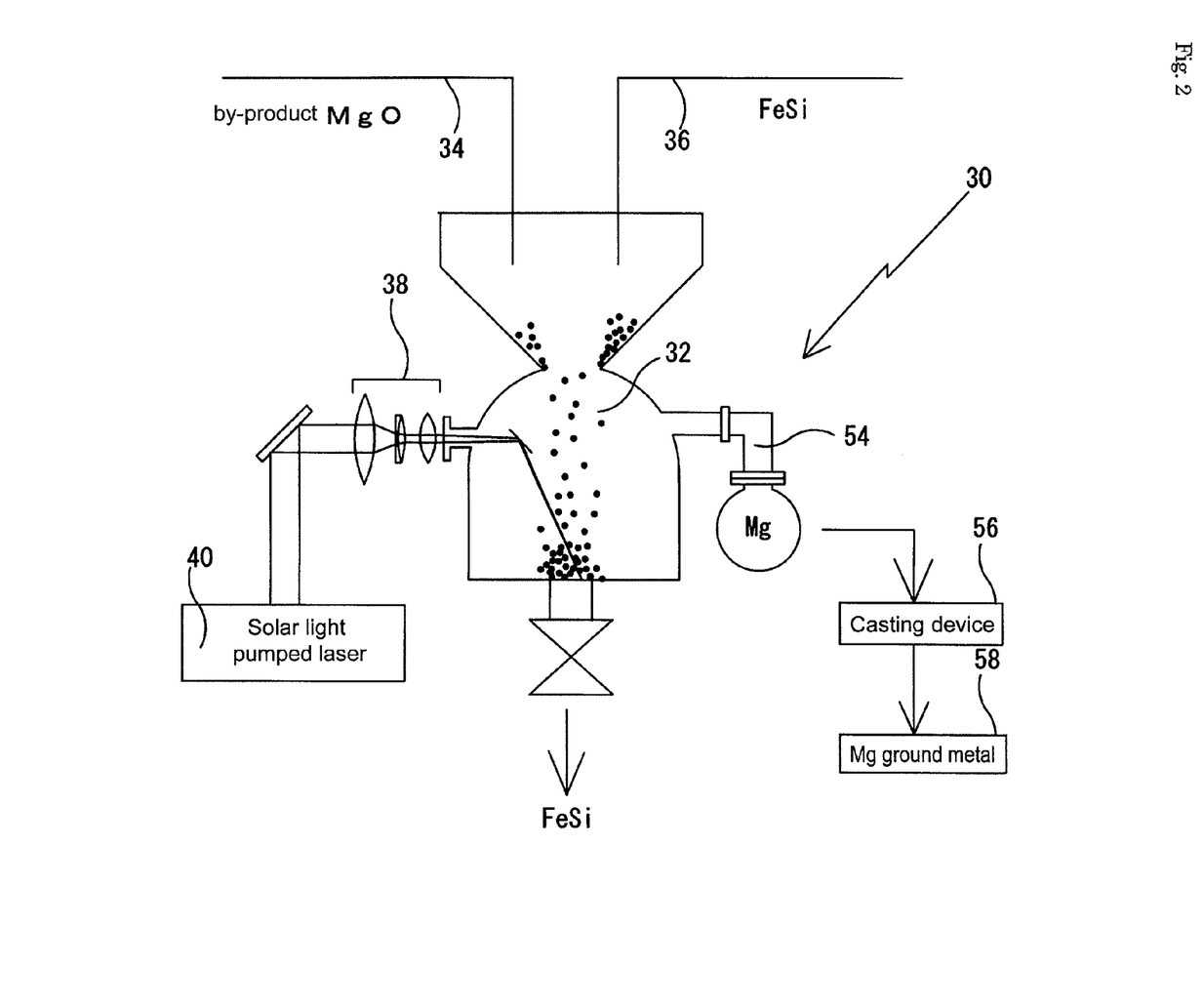
FIG. 2 is schematic view of the laser reduction apparatus according to the present invention.

FIG. 2 shows the laser reduction apparatus used for regenerating metal magnesium. The apparatus 30 shown in FIG. 2 generally includes the vacuum vessel 32, the line 34 for supplying a metal oxide, the line 36 for supplying iron silicide used for reduction in a particular embodiment of the present invention, and the optical system 38 having an irradiation window provided with the vacuum vessel into which a laser beam is introduced to locally generate a high temperature. A metal oxide is supplied into the vacuum vessel 32 through the line 34 and a hopper after being heated in a kiln (not shown) to convert a hydroxide into the oxide. In addition, according to another embodiment of the present invention, a silicon (Si) element may be used alone or may not be used for reduction.

Meanwhile, after the iron silicate being supplied through the line 36, the vacuum vessel 32 is decompressed and then a laser beam is irradiated through the optical system 38 to generate reduction reaction. In this case, a laser which is pumped by a flash lamp or a semiconductor laser, using a laser medium made of a ruby, $Nd^{3+}$: YAG, a garnet, a sapphire, an emerald, an alexandrite or the like, doped by a lanthanoid element such as $Cr^{3+}$, $Co^{2+}$, Ce, Pr, Pm, Sm, Eu, Th, Dy, Ho, Er, Tm, Yb, Lu, an ion thereof, a transition metal element, or a transition metal ion may be used in the present invention. Further, according to another preferred embodiment of the present invention, a catalyst for promoting the reduction may be used. Furthermore, in the present invention, in order to irradiate a laser beam more efficiently, the optical system 38 is provided with an optical scanner mechanism to irradiate a laser beam onto an object substance such as magnesium oxide homogeneously as far as possible.

Figure 3:
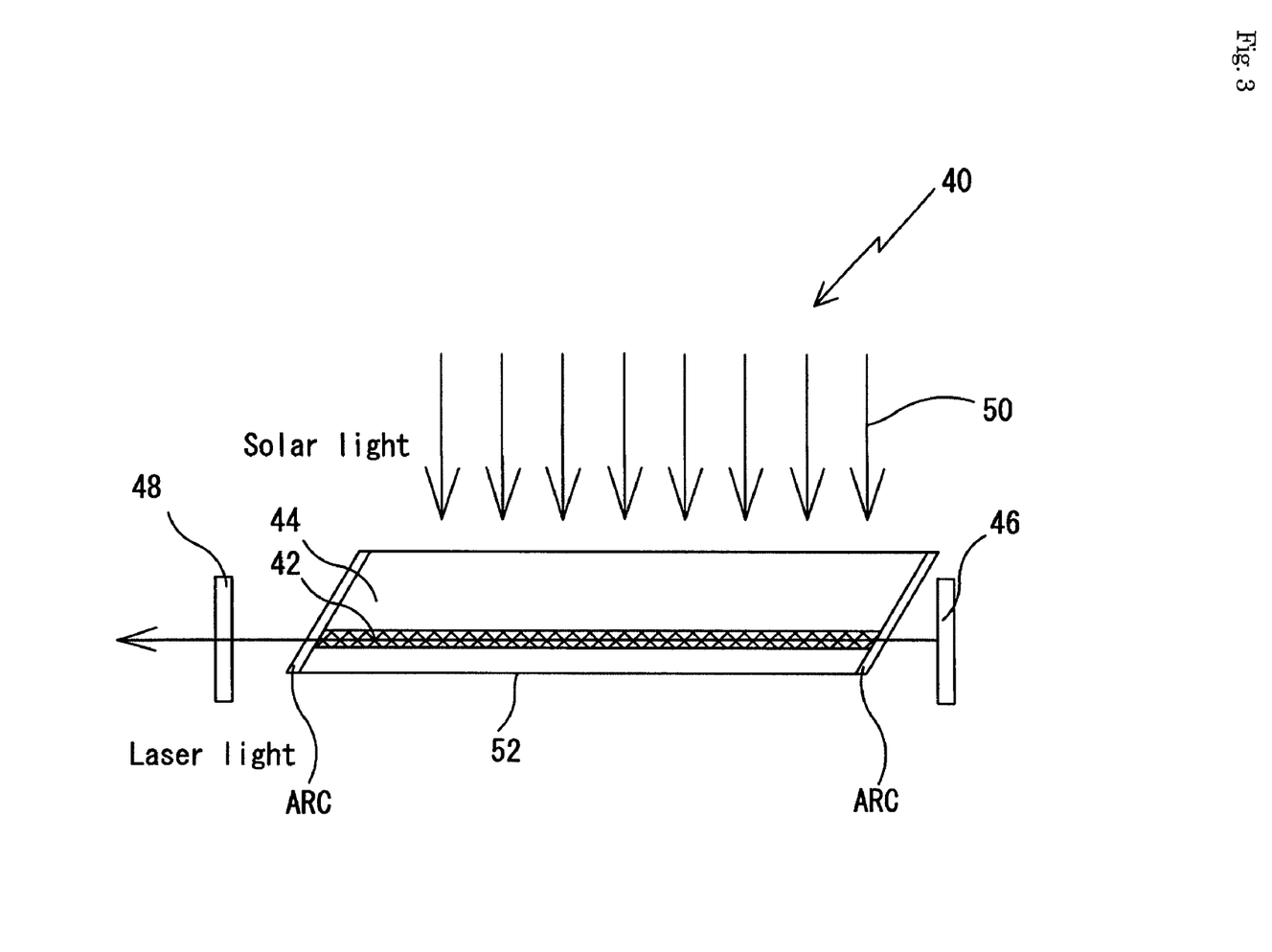
FIG. 3 is the schematic side view of the solar light pumped laser used in the present invention.

Further, in the present invention, a reduction reaction may be generated using a solar light pumped laser together with or instead of the above laser. FIG. 3 shows the schematic structure of the solar light pumped laser 40 according to the present invention. The solar light pumped laser 40 according to the present invention includes the laser medium 42, the container device 44 for holding the laser medium 42, the total reflection mirror 46 disposed on one end of the laser medium 42 and the half mirror 48 disposed on the other end. The container device 44 further includes the optical element 52 for focusing solar light 50 onto the laser medium 42 to optically pump the laser medium 42 and form a population inversion. The optical element 52 including a reflection element, a lens element and the like is cooled by a cooling liquid such as water held in the container device 44, enabling highly efficient laser oscillation to be performed under efficient cooling.

Both ends of the container device 44 give a Brewster angle specified by a material forming each end of the container device 44 and air or the laser medium 42 and air when the laser medium 42 is directly exposed at each end of the container device 44. In addition, when the may not be requested, the ends of other angles may be possible. The container device 44 may be formed integrally with the laser medium 42, or the laser medium 42 may be fixed on each end of the container device 44 by using an appropriate flange, O ring or the like. Further, the end surfaces of the container device 44 are coated with an anti-reflection coating ARC to improve the efficiency. In addition, when the anti-reflection coating ARC does not need to be used or cannot be used structurally in the present invention, the anti-reflection coating ARC may be omitted. The container device 44 is filled with a cooling liquid such as water to cool the laser medium 42 accompanying with laser oscillation and to prevent the laser medium from being damaged by a thermal shock. The cross-sectional shape of the container device 44 may be a circular shape, an elliptic shape or a parabolic shape. When the container device having a circular cross-sectional shape is adopted, the laser medium is disposed on a position in accordance with the curvature of the container device and the reflective index of the cooling medium. Further, when the container device having an elliptic cross-sectional shape is adopted, the laser medium may be disposed on one focal point to focus the solar light on the other focal point. These shapes may be used in combination to focus the solar light onto the laser medium.

In the present invention, since the container device 44 has a function for focusing solar light onto the laser medium 42 and retains a cooling liquid therein, the container device 44 may be cooled by the cooling liquid together with the laser medium. Water is preferably used as the cooling liquid from viewpoints of the cost and the operability. Further, the cooling medium may transmit solar light while being enclosed or flown in the container device having a shape capable of focusing the solar light onto the laser medium.

Further, a light emitting diode or a semiconductor laser generating a laser beam with corresponding wavelength to a laser wavelength may be used in the present invention so as to appropriately trigger laser oscillation. Furthermore, in order to trigger laser oscillation, a material having an optical Kerr effect and a polarizing plate for polarizing a polarization angle in response to an external electrical trigger may be used. Further, an oversaturated dye may be used to trigger laser oscillation in Q switch mode.

The laser medium may be formed into an optically transparent rod having a diameter of several millimeters to several centimeters. Particular examples of the laser media available in the present invention include, such as, a ruby ($Cr^{3+}$: $Al_2O_3$); YAG ($Nd^{3+}$: $Y_3Al_5O_{12}$); an alexandrite ($Cr^{3+}$: $BeAl_2O_4$); an emerald ($Cr^{3+}$: $Be_3Al_2$ $(SiO_3)_6$); a laser medium formed by adding $Cr^{3+}$ and $Nd^{3+}$ to a so-called garnet represented by general formula $A_3B_2C_3O_{12}$, where site A thereof is used an element selected from the group consisting of Ga and Al in used, site B thereof is used an element selected from the group consisting of Ga, Sc and Lu in used, and site C thereof is used an element selected from the group consisting of Y, Gd, La and Lu is used; a sapphire ($Ti^{3+}$: $Al_2O_3$); $Co^{2+}$: $MgF_2$; $Cr^{3+}$: $ScBO_3$; $Nd^{3+}$: GGG ($Gd_3Ga_5O_{12}$), Cr and Nd: GSGG ($Gd_3(GaSc)_5O_{12}$). Any laser medium may be used as far as it is capable of forming an appropriate absorption band within the range of solar light due to crystal field thereof. Further, a laser medium having different characteristics doped by, other rare-earth element, for example, lanthanoid element including Ce, Pr, Pm, Sm, Eu, Th, Dy, Ho, Er, Tm, Yb or Lu, ions thereof, a transition metal element, or a transition metal ion may be used for the laser medium 42.

The total reflection mirror 46 may be constructed by using a mirror with a metal coating such as AL deposition; a mirror including a coating by which the laser oscillation wavelength may be selectively reflected prepared by a dielectric multilayer coating; or a prism system which uses the total reflection thereof. The half mirror 48 may preferably be a mirror having a transmittance within the range from approximately 10% to approximately 90% coated with a dielectric multilayer film. Further, any known coating including a dielectric multilayer film coating or a metal coating may be used for the reflection elements 52 available in the present invention.

With referring to FIG. 2 again, the present invention will be described. A metal generated by being heated followed by being reduced is cooled by the condenser 54, then is recovered, is cast with a casting apparatus 56, and is recovered as a ground metal 58. Further, iron silicide stored in the vacuum vessel 32 is also recovered, and is recovered as slug after a fusible component being separated therefrom. The recovered ground metal 58 may be supplied again to the hydrogen generation apparatus according to the present invention or may be used for another purpose. Furthermore, a catalyst such as iron silicide may not be used in the present invention.

Further, when $NO_x$, $CO_2$, dioxin or an endocrine disruptor chemical is reduced according to the present invention, for example, the hydrogen gas generated by the hydrogen generation apparatus shown in FIG. 1 is introduced into a chamber to generate a reduction atmosphere, generating reduction reaction by irradiating with the solar light pumped laser to decompose the $NO_x$, $CO_2$, dioxin or an endocrine disruptor chemical, or convert the same into another chemical substance. Further, in the present invention, when effective reduction is possibly performed only with a laser beam, hydrogen gas is not always required to supply.

Section 3

Energy Conversion Apparatus Using Laser Reduction

Figure 4:
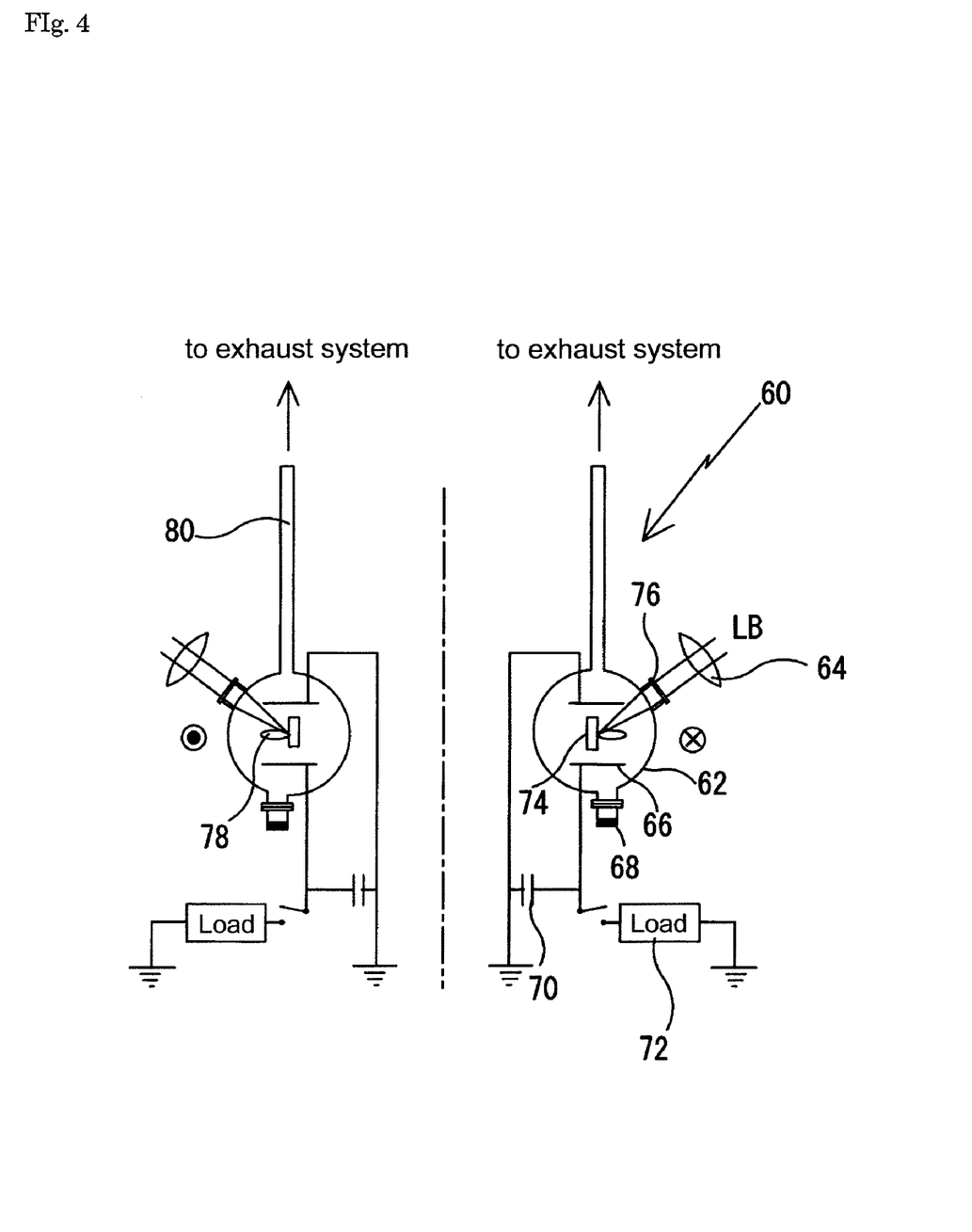
FIG. 4 is the schematic view of the energy conversion apparatus according to the present invention.

FIG. 4 shows another embodiment of the energy conversion apparatus according to the present invention. The energy conversion apparatus 60 shown in FIG. 4 includes the toroidal container 62 formed into a toroidal shape in which grids 66 and an oxygen-containing chemical substance 74 are disposed. According to a particular embodiment of the present invention, the oxygen-containing chemical substance 74 available in the present invention includes, but not limited to MgO. The laser beam LB is irradiated from a light transparent window 76 into the oxygen-containing chemical substance 74. The laser beam used on this occasion may be generated using the aforementioned laser. The laser beam LB is focused onto the oxygen-containing chemical substance 74 by a focusing optical system 64 such as a lens to decompose the oxygen-containing chemical substance 74 to generate the plasma 78. According to the particular embodiment of the present invention, the plasma 78 includes $Mg^+$, and corresponding anions are formed therein to give an electric charge balance.

Further, a magnetic field is applied along a peripheral direction of the toroidal container 62 of the energy conversion apparatus 60 so that the generated plasma 78 could be magnetically confined. Accordingly, the charged particles in the plasma 78 move in a drift motion at the speed represented by $(\nabla B/B) R_s U$. In the above formula, B represents an intensity of the magnetic field, VB represents a spatial gradient of the magnetic field, $R_s$, represents a Larmor radius (rotation radius in a magnetic field) and U represents a rotation rate of the charged particles. Accordingly, in the structure shown in FIG. 4, when a potential is formed at the grids 66, the positive and negative charged particles move in a drift motion in opposing directions within the Larmor radius to generate an electric current. The energy conversion apparatus 60 shown in FIG. 4 lead this electric current into outside of the toroidal container 62 by using a hermetic seal or the like to accumulate into the capacitor 70.

The intensity of the magnetic field used in the present invention may be equal or less than 10 T. The electric charges accumulated in the capacitor for a particular time period are supplied to a load 72 to drive the load. Accordingly, it is possible for converting a chemical-optical energy into an electric energy by using the charged particles generated when the laser reduction according to the present invention is performed. Further, the recovery container 68 for recovering a metal giving a cation is formed in the toroidal container 62, recovering a metal such as Mg, and exhausting the gas generated from an anion to the outside of the toroidal container 62 through an exhaust line 80.

Figure 5:
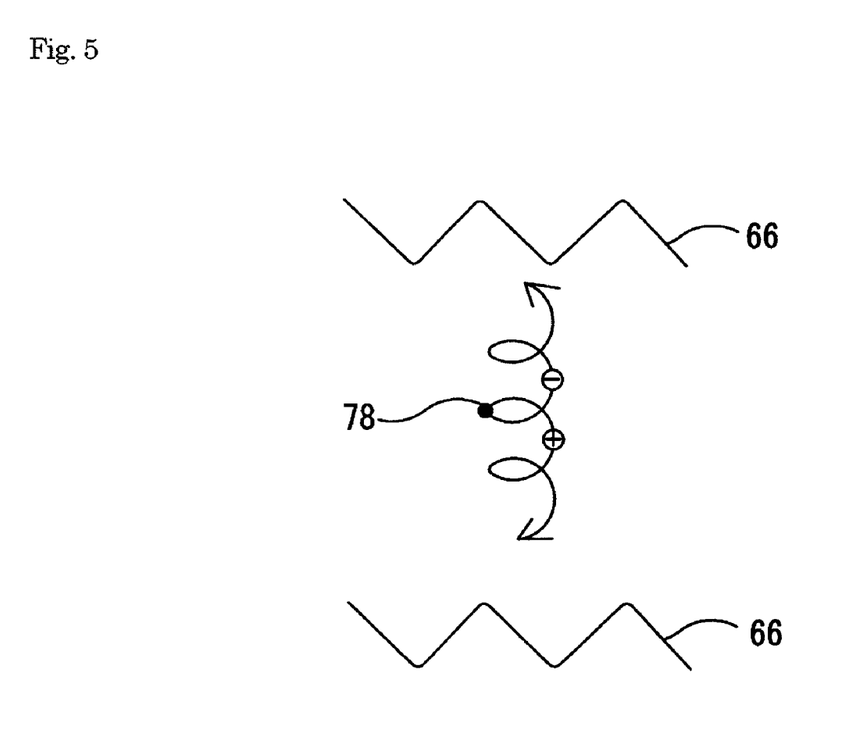
FIG. 5 is the schematic view of the drift motion of the charged particles in the energy conversion apparatus according to the present invention.

FIG. 5 shows the schematic diagram of the charged particles moving in a drift motion between grids 66. The upper part of the grids 66 is grounded. A positive ion generated in the plasma 78 moves downward in a drift motion with Larmor radius and a negative ion moves upward in a drift motion with Larmor radius to generate a electric current between the grids. The grids 66 are formed as appropriate meshes and enable positive ions to be discharged and to pass through. In addition, in the present invention, an appropriate potential difference may be established between the grids 66.

Figure 6:
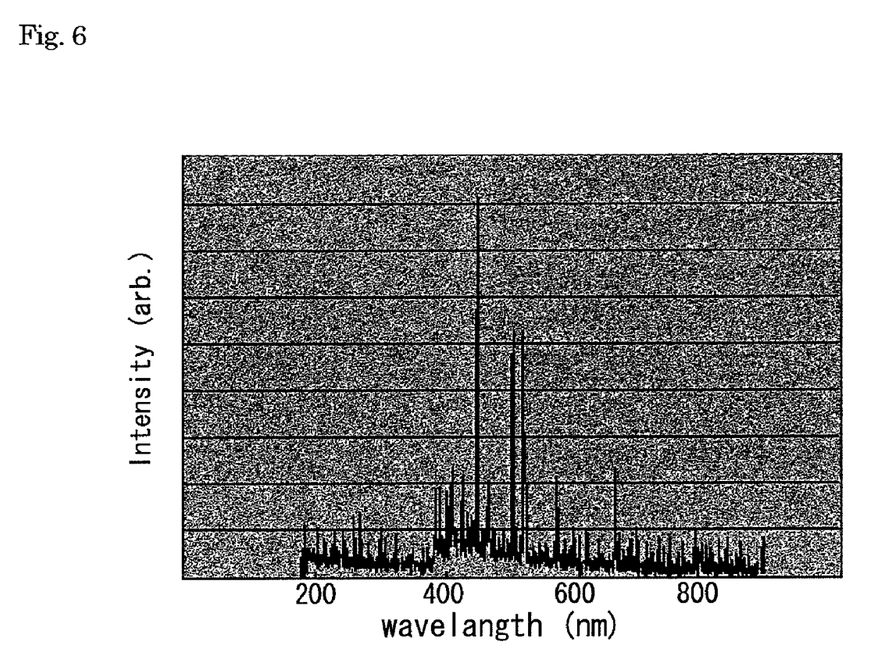
FIG. 6 is the view of the emission spectrum of the cation from the plasma generated using the energy conversion apparatus according to the present invention.

FIG. 6 shows the emission spectrum of the positive ion specie observed in the plasma formed by the present invention. FIG. 6 shows the emission spectrum (MgII, 448.1130 nm, 2P6 4f-2p6 3d, and MgI, 518.36042 nm, 3s4s-3s3p) of $Mg^+$ obtained with regard to the plasma having approximately 10,000 K, the plasma being formed by irradiating by an $Nd^{3+}$: YAG laser (pulse output: 0.3 J, pulse width: 5 ns) onto an MgO target. As shown if FIG. 6, the emission of $Mg^+$ was clearly observed from the plasma which is confined in toroidal container according to the present invention, and it was demonstrated that the charged particles could be generate in the plasma which is generated by the laser irradiation.

Section 4

Hydrogen Generation Apparatus—Second Embodiment

Figure 7:
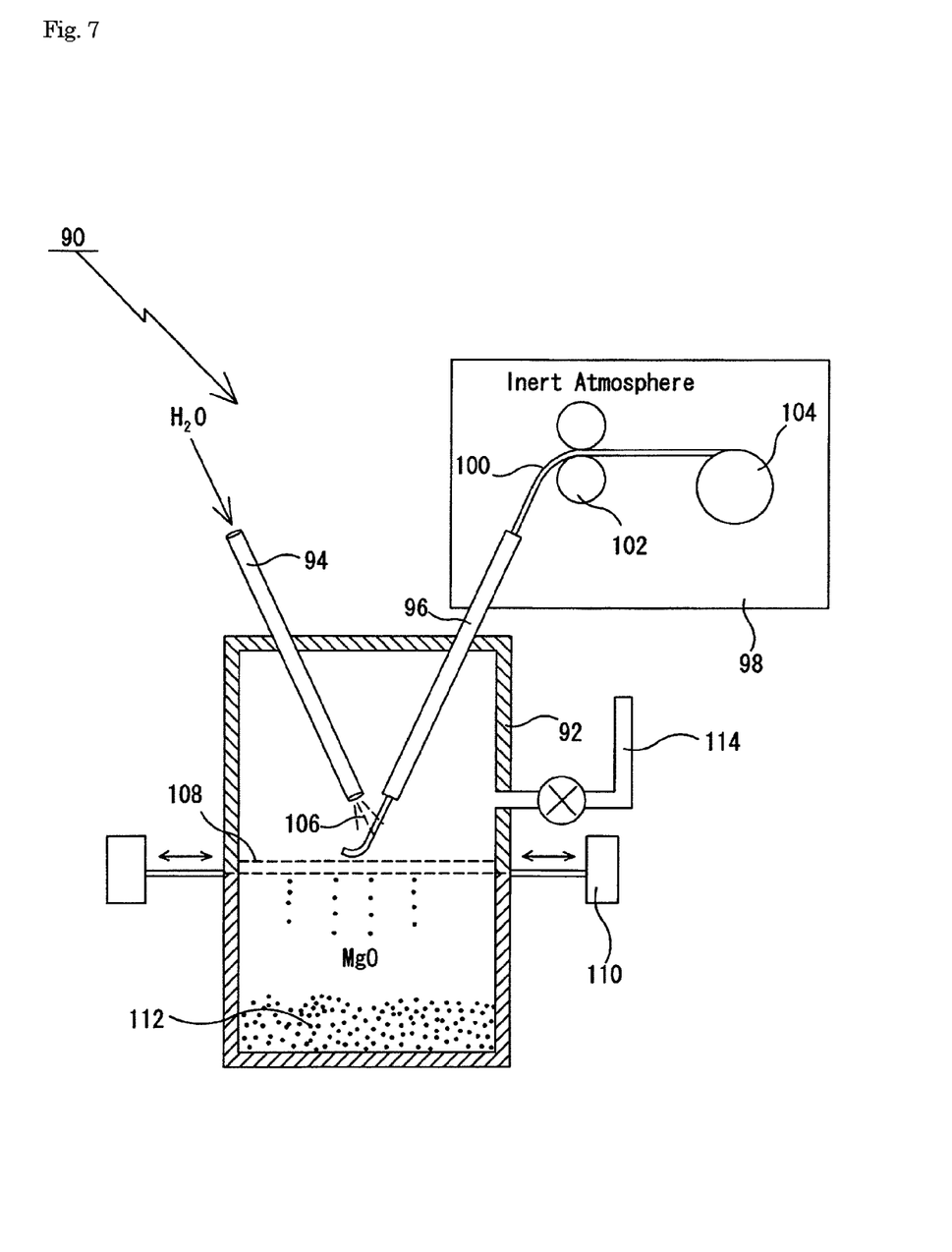
FIG. 7 is view of the essential structure of the second embodiment of the hydrogen generation apparatus according to the present invention.

FIG. 7 shows the essential structure of the second embodiment of the hydrogen generation apparatus according to the present invention. The hydrogen generation apparatus 90 shown in FIG. 7 is common to the hydrogen generation apparatus shown in FIG. 1 and the like in that it generates hydrogen by oxidizing sodium (Na), potassium (K), magnesium (Mg), calcium (Ca), aluminum (Al), zinc (Zn) or admixture thereof with $H_2O$ and, on the contrary, reducing $H_2O$ into $H_2$. In particular, in the second embodiment shown in FIG. 7, hydrogen is generated by consecutively introducing materials in forms of a film, a plate, flake and a chip instead of a powder material of Mg or the like.

FIG. 7 will be described in more detail. The hydrogen generation apparatus 90 shown in FIG. 7 includes the reaction vessel 92, the introduction tube 94 inserted into the reaction vessel 92 for introducing $H_2O$ into the reaction vessel 92, and the feeder 96 for introducing a material such as Mg. The reaction vessel 92 and the like may be formed of materials including SUS304, SUS316, SUS321, SUS329, SUS309, SUS310, SUS317, SUS405, SUS347, SUS420 and SUS410, and the sealing property thereof from the atmospheric air may be attained by using an appropriate seal means such as an O-ring or a metal seal. $H_2O$ is preferably lead into the reaction vessel 92 in a state of high temperature and high pressure steam and, in the embodiment shown in FIG. 7, contact with Mg formed into a film to generate an oxidization reaction at a position where $H_2O$ discharge from the introduction tube 94.

As a result of the oxidization reaction, MgO and $H_2$ are generated. The generated $H_2$ is lead to the outside of the reaction vessel 92 through the exhaust tube 114 and supplied directly to a fuel cell or stored in a hydrogen storage alloy. On the other hand, the hydrogen generation apparatus 90 shown in FIG. 7 is provided with the sieve 108 formed of meshes extending internally and overlapping with each other. The sieve 108 being reciprocated in a lateral direction on the plane of the drawing by a motor 110 disposed outside the reaction vessel 92 or the like, crashes a mass into a powder 112 of MgO having a given particle diameter, storing the powder in the bottom of the reaction vessel 92.

Further, the materials such as Mg in forms of a film, a plate, flakes, a chip and the like are introduced into the reaction vessel 92 through the feeder 96. The feeder 96 used herein may be of any type so far as it is capable of supplying materials in forms of a film, flake and the like. For example, when a material such as Mg in a form of a film or a plate is introduced into the reaction vessel 92, a die may be used as the feeder 96. Further, in the present invention, a material such as Mg in a form of a film, plate, flake or a chip may be stored separately in a storage chamber 98 so as not to be oxidized by air before being introduced into the die.

Inside of the storage chamber 98 is preferably purged by appropriate inert gas such as $N_2$ or Ar. A thickness of a material available in the present invention in a form a film or a plate may be 0.1 millimeter to several millimeters. When a material in a form of flake is adopted, the lengthwise particle diameter thereof may be several millimeters to several centimeters. In the present invention, an amount of supplied $H_2O$ and an amount of a supplied material film or the like may be controlled in order to control an amount of generated $H_2$ as well as a calorific value. Further, a material which has endothermic or exothermic caloric value of oxidation smaller than that of Mg such as zinc may be mixed in order to control a calorific value.

The material roll 104 and the carriage roller 102 are disposed in the storage chamber 98 to supply the material 100 in a form of a film or a plate into the reaction vessel 92 in response to a degree of oxidization and consumption of the material in the reaction vessel 92. In addition, according to still another embodiment of the present invention, a cutting edge may be disposed in the storage chamber 98 to provide the material having fresh surface ordinary by rotating the material roll 104, and the material roll 104 may be rotated utilizing $H_2$ or heat exhausted from the reaction vessel 92. The generated oxide powder 112 of MgO or the like is recovered from an exhaust port (not shown) regularly or each time where predetermined amount of the powder is stored, providing for energy conversion by laser reduction or the like.

Figure 8:
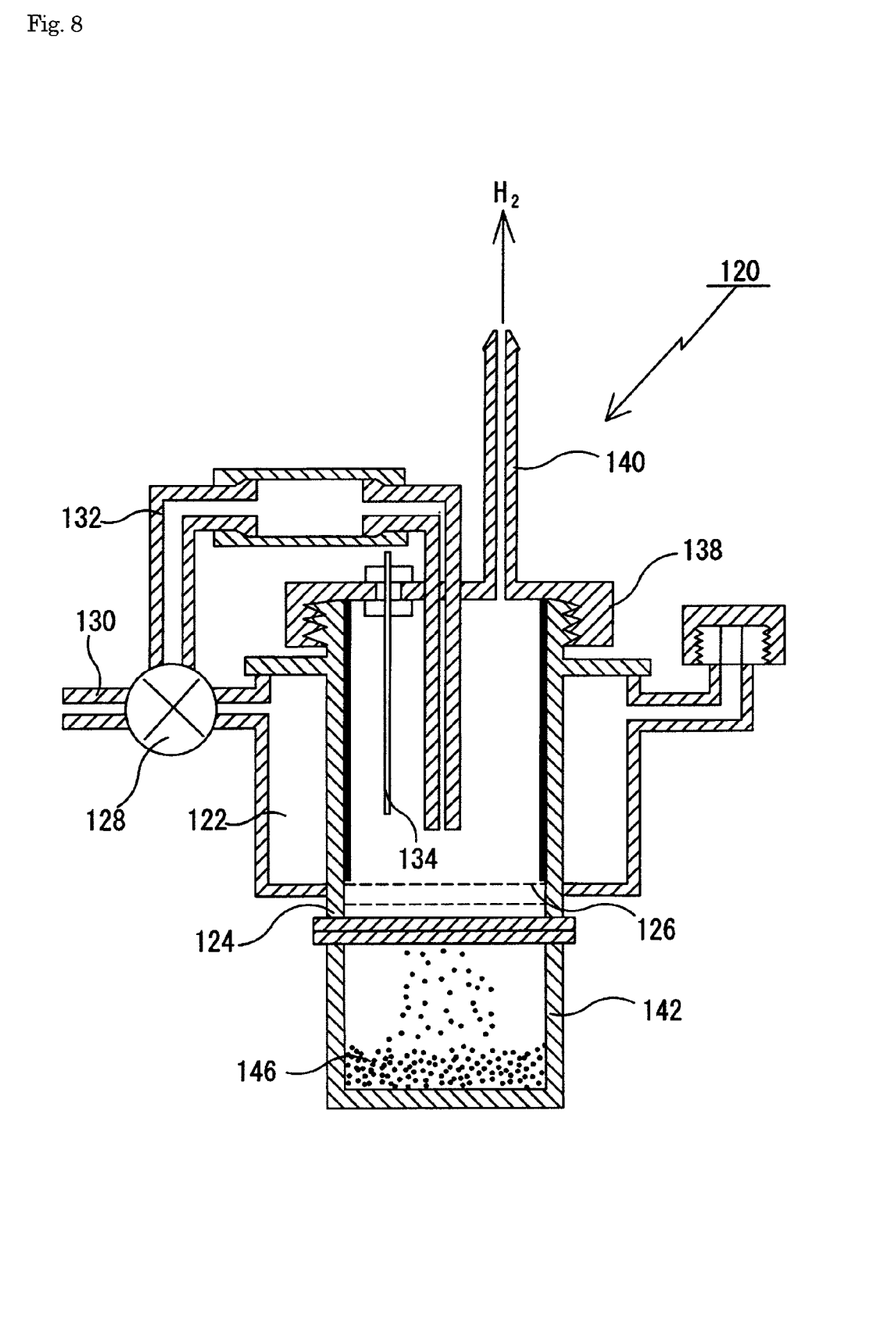
FIG. 8 is the view of the detailed structure of the second embodiment of the hydrogen generation apparatus according to the present invention.

FIG. 8 shows the detailed structure of the second embodiment of the hydrogen generation apparatus according to the present invention. The hydrogen generation apparatus 120 shown in FIG. 8 includes the reaction vessel 124 and the heat-exchanger jacket 122 surrounded with the reaction vessel 124 for exchanging heat from the reaction vessel 124. The heat-exchanger jacket 122 is connected with the coolant (water) supply line 130 via the valve 128. The valve 128 may be, for example, a three-way valve, and may switch from alternatively a coolant supply mode to a heat-exchange/steam supply mode by connecting a supply line 132, or vice versa in response to the stop position thereof. The tip of the supply line 132 is introduced into the reaction vessel 124 to introduce steam (at up to 200 Celsius degrees) generated by heat-exchange into the reaction vessel 124.

Further, in the embodiment shown in FIG. 8, the material such as Mg in a form of a plate or a film is supplied along the inner sidewall of the reaction vessel 124 by using an introduction slit (not shown) and a feed mechanism (not shown) formed on the upper part thereof. In addition, according to the present invention, the material in a form of a plate, a film, flake or the like may be introduced by using any method and any configuration as far as the processing is not disturbed, and the introduction of the material along the inner sidewall is not always required. On the other hand, the spark gap 134 made of tungsten (W) or the like is inserted to the reaction vessel 124 as an activation means for giving initial combustion to provide a temperature where the reaction is maintained, so that burning of the material in the reaction vessel 124 at the initial stage is possible.

In further another embodiment of the present invention, a YAG laser, a semiconductor laser, a solar light pumped laser or the like may be used as an activation means instead of the spark gap 134. Further, in the present invention, a metal that generates reduction reaction with water at a high temperature as exothermic reaction is preferably used. On this occasion, a material which has small endothermic or exothermic caloric value in relation to reduction reaction, such as zinc may be used as a reaction control additive.

The cap 138 on which a conclusion means is formed is connected to the upper part of the reaction vessel 134. The exhaust line 140 is extended from the cap 138 to exhaust generated $H_2$ from the cap 138. The cap 138 is connected to the reaction vessel 124 by the conclusion means resistible to high temperature and high pressure. Any known means may be used as such the connection means, and a particular example thereof is a Kakura joint. The sieve 126 for crashing a generated oxide is formed at the lower part of the reaction vessel 124. The crashed oxide powder 146 is stored in the recovery container 142 formed under the sieve 126. In addition, in the present invention, the reaction vessel 124 is connected to the recovery container 142 by using a flange. For example, monitoring the generated powder from an observation window formed on the recovery container 142 and, after a predetermined amount of the powder being accumulated, the reaction vessel 124 and the recovery container 142 connected by bolts and nuts are separated, thereby being made it possible to recover the powder.

The recovered oxide such as MgO may be supplied again to the laser reduction method shown in FIG. 2 and the like to regenerate Mg and the like. Further, $H_2$ generated by the hydrogen generation apparatus shown in FIG. 8 may be used directly as a fuel for a fuel cell. Generated $H_2$ may be stored in a hydrogen storage alloy to improve the handling property thereof to use as the fuel for the fuel cell. According to further another embodiment of the present invention, excessive steam may be supplied to a steam turbine to generate electric power. The water cooled by the steam turbine may be circulated to the supply line 130 again to use as a heat-exchange medium for heat generated in the reaction vessel 124.

In the present invention, water may be used directly as a medium for the heat exchanging of the reaction vessel 124. However, use of coolant such as Freon (Trademark) substitutes or supercritical fluid separately from water enables the control of the cooling efficiency and improving of the reaction controllability. As described hereinbefore, the hydrogen generation apparatus 120 shown in FIG. 8 according to the present invention may be used as a hydrogen supply source and may apply to a pollution-free type internal combustion engine, pollution-free type electric power generator and the like, thereby being made it possible to reduce an environmental load remarkably.

Further, the present invention may be used for emergency urban lifeline for a disaster. When a disaster such as a massive earthquake occurs, securing of a lifeline and fire fighting are important matters. In particular, when an earthquake as large as magnitude 7 occurs in a large city such as Tokyo, Osaka, Nagoya, Fukuoka or another city, it is estimated that 77% of destroyed houses are lost by fire. Accordingly, though Tokyo Metropolis secures water for fire fighting in 12,000 locations, however it is considered that fire engines would not possible to reach these locations on the post-disaster.

The present invention may also be used as an emergency lifeline restoration apparatus using a reaction between water and Mg which does not have a spontaneous combustibility. The present invention work as an emergency lifeline restoration apparatus as follows:

(1) Extinguishment: A gas turbine is activated by heat generated by a reaction of Mg with water and/or heat generated by hydrogen, fighting fire on a self-governing body by using a pump used to supply water from secures water for fire. Assume that a gas turbine, a rotary engine, a reciprocating engine, Stirling engine or the like in which hydrogen generated by the present invention is burned using 35 cm square of Mg, a power for driving a fire engine for 6 to 8 hours could be secured.

(2) Drinking water: Since the heat generated by the reaction of Mg with water enables water to evaporate, accordingly distilled water could secured and supplying as drinking water. For example, water for fire fighting is used to generate steam as well as hydrogen by the heat generated during reaction of Mg using 35 cm square, and then condensation of this steam enable to generate 800 kg of safe drinking water.

(3) Electricity: Hydrogen is used as a fuel for driving a gas turbine, a rotary engine or a reciprocating engine to generate and secure an electric power. In this occasion, it is considered that an electric power required of one family for one or two weeks to about one month may be secured using 35 cm square of Mg.

(4) Hot water: Heat generated in the above process for condensing the distilled water is used to boil the water for fire fighting in a regenerative manner, thereby securing hot water for a bath and the like. According to the present invention, the advantage of Mg is that, since Mg does not have combustibility like gasoline or crude petroleum, it could be buried underground near the surface of the ground and stored safely with simple shielding, thereby problems in relation to leakage, explosion or a sanitary safety is not caused even when a large-scale disaster occurs.

Section 5

Reduction Apparatus Using Laser Application

Figure 9:
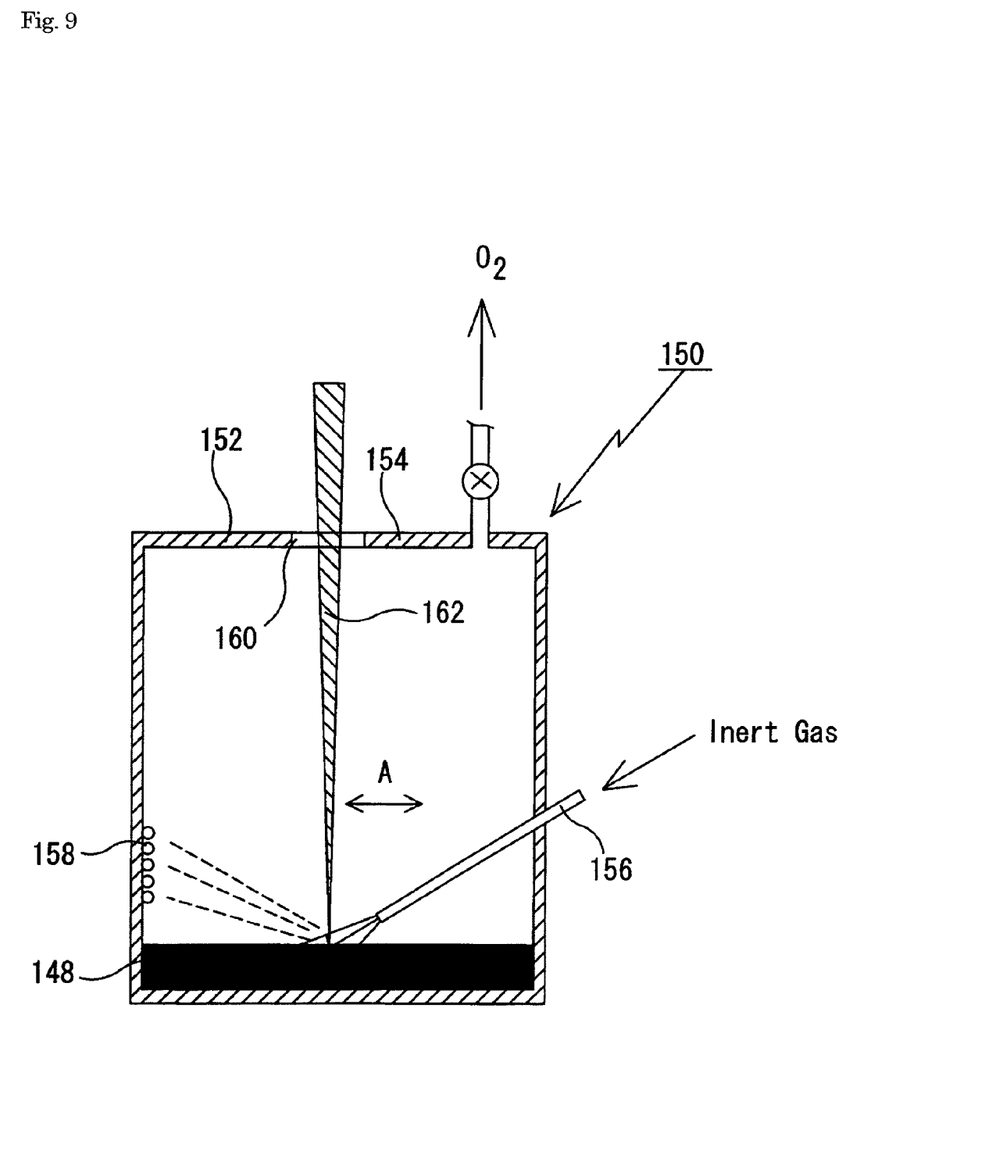
FIG. 9 is the view of another embodiment of the laser reduction apparatus according to the present invention.

FIG. 9 shows the still another embodiment of the laser reduction apparatus according to the present invention. The laser reduction apparatus 150 shown in FIG. 9 includes: the container 152 provided with the window 160 from which a laser beam is entered, and the nozzle 156 for emitting inert gas such as helium, argon or nitrogen into the container 152. MgO 148 in a form of a clad, particles or pellets is stored in the lower part of the container 152. Further, the laser beam 162 is irradiated onto MgO from the upper part of the container 152 and is focused on an appropriate position of MgO to melt MgO by laser ablation.

On the other hand, the inert gas is emitted at a high speed from the nozzle 156 onto MgO 148 melted by the laser beam 162, and separating Mg and $O_2$ generated by 2 MgO->2 Mg+$O_2$ so as not to recombine. Generated solid Mg adheres onto the inner wall of the container 152 by the pressure of the inert gas and is recovered since then. On the other hand, generated $O_2$ is lead out of the container 152 through an exhaust tube and a valve disposed on the upper part of the container 152. In addition, in the laser reduction apparatus 150 according to the present invention shown in FIG. 9, the laser beam 162 is moved in a direction represented by the arrow A to increase a melted area of MgO, so that the reduction efficiency could be improved. Further, in the present invention, a temperature of the inert gas may be elevated and then emitted into the container 152 so that the inside thereof is not cooled by the emitted inert gas.

INDUSTRIAL APPLICABILITY

According to the present invention, hydrogen could be generated and stored as the occasion demands while giving an environmental load at minimum level. Accordingly, there may be provided a hydrogen generation apparatus, a laser reduction apparatus, an energy conversion apparatus and a hydrogen generation method, all having extremely high industrial values, capable of supplying a hydrogen energy for more various purposes and greatly changing an energy infrastructure basis, thereby greatly contributing to the solution of problems such as global warming and shortage of fossil fuels. Further, the hydrogen generated by the present invention is capable of providing for a fuel cell and furthermore, capable of applying as a fuel directly for an internal combustion engine and appropriately using as an emergency lifeline.

DESCRIPTION OF NUMERALS

10 - - - Hydrogen generation apparatus, 12 - - - Reaction vessel, 14 - - - Hydrogen recovery tube, 16 - - - Water reservoir, 18 - - - Valve, 20 - - - Opening, 22 - - - Actuator, 24 - - - Material, 26 - - - Hydrogen storage device, 30 - - - Laser reduction apparatus, 32 - - - Vacuum vessel, 34 - - - Line, 36 - - - Line, 38 - - - Optical system, La - - - Laser, 40 - - - Solar light pumped laser, 42 - - - Laser medium, 44 - - - Container device, 46 - - - Total reflection mirror, 48 - - - Half mirror, 50 - - - Solar light, 52 - - - Optical element, ARC - - - Anti-reflection coating, 54 - - - Condenser, 56 - - - Casting apparatus, 58 - - - Ground metal, 60 - - - Energy conversion apparatus, 62 - - - Toroidal container, 64 - - - Focusing optical system, 66 - - - Grid, 68 - - - Recovery container, 70 - - - Capacitor, 72 - - - Load, 74 - - - Target, 76 - - - Light transparent window, 78 - - - Plasma, 80 - - - Exhaust line, LB - - - Laser beam

The invention claimed is:

1. An assembly comprising:
   a metal oxide powder;
   a metal silicide for a reduction agent; and
   a laser reduction apparatus for reducing said metal oxide powder into metal by using a laser beam, said laser reduction apparatus having:
   a supply line;
   a vacuum vessel that receives said metal oxide powder and said metal silicide supplied through said supply line, said vacuum vessel being provided with a window; and
   a laser that irradiates a laser beam into said vacuum vessel through said window to reduce said metal oxide powder with heat generated by irradiation of said laser.

2. The assembly according to claim 1, wherein said metal oxide powder is selected from a group consisting of sodium oxide, potassium oxide, magnesium oxide, aluminum oxide, zinc oxide and any admixture thereof.

3. The assembly according to claim 1, wherein said laser is a solar light pumped laser.

* * * * *

UNITED STATES PATENT AND TRADEMARK OFFICE
Certificate

Patent No. 8,137,638 B2                                                                        Patented: March 20, 2012

On petition requesting issuance of a certificate for correction of inventorship pursuant to 35 U.S.C. 256, it has been found that the above identified patent, through error and without any deceptive intent, improperly sets forth the inventorship.
Accordingly, it is hereby certified that the correct inventorship of this patent is: Takashi Yabe, Tokyo (JP).

Signed and Sealed this Twenty-sixth Day of March 2013.

KEITH WALKER
*Supervisory Patent Examiner*
Art Unit 1735
Technology Center 1700